Jan. 10, 1961    R. A. PHILLIPS    2,967,660
GROUND SPEED COMPUTER
Filed Dec. 13, 1956    2 Sheets-Sheet 1

INVENTOR.
RICHARD A. PHILLIPS
BY
ATTORNEYS

United States Patent Office 2,967,660
Patented Jan. 10, 1961

2,967,660

GROUND SPEED COMPUTER

Richard A. Phillips, East Norwich, N.Y., assignor, by mesne assignments, to the United States of America as represented by the Secretary of the Navy Filed Dec. 13, 1956, Ser. No. 628,208

1 Claim. (Cl. 235—61)

This invention relates to a ground speed computer for use in a bomb director and is used to compute the ground speed and relative course angle of a military aircraft, such as a bomber, using input factors of wind, air speed, and relative heading angle.

Various input factors are required to be furnished a bomb director before and during the course of a bombing run in order that a missile or bomb can be accurately dropped on a target. One important factor required to be known is ground speed, that is, the speed of an airplane in flight relative to the ground. In the present invention four input factors are furnished the computer, namely, true air speed (VA), relative heading ($\theta$R), range wind (RVW), and cross wind ($u$VW). The latter two components of range wind and cross wind are provided in proper form as these quantities can be computed in another component of the bomb director called a wind resolver. The ground speed computer described herein resolves the air speed into two components, hereafter referred to as range air speed (RVA), which is parallel to the line of sight, and azimuth air speed ($u$VA), which is perpendicular to the line of sight. The computer described herein then adds range wind and range air speed to produce range velocity (VR) and also cross wind and azimuth air speed are added to produce azimuth velocity ($Vu$). Range velocity and azimuth velocity are then transmitted as outputs of the ground speed computer and are furnished as inputs to other bomb director components, and also range velocity and azimuth velocity are resolved vectorially in the computer to produce ground speed (VG) and relative course angle (NR), and then these quantities are likewise transmitted to subsequent units in the bomb director.

While ground speed computers are widely used in bombing computers and other fire control systems, heretofore these devices have been very complicated in nature and require highly precision parts and thus production in quantities is both costly and slow. The ground speed computer disclosed herein shows a novel way of producing the desired data and yet is relatively simple in operation and procedure, thus eliminating highly precision parts, simplifying production, and decreasing assembly and maintenance costs.

It is therefore a general object of the present invention to provide a simple and convenient device for computing ground speed and relative course heading of an aircraft for use in a bomb director.

Other objects and many advantages of the present invention will be readily appreciated as the same becomes better understood by reference to the following detailed description when considered in connection with the accompanying drawings wherein.

Figure 1:
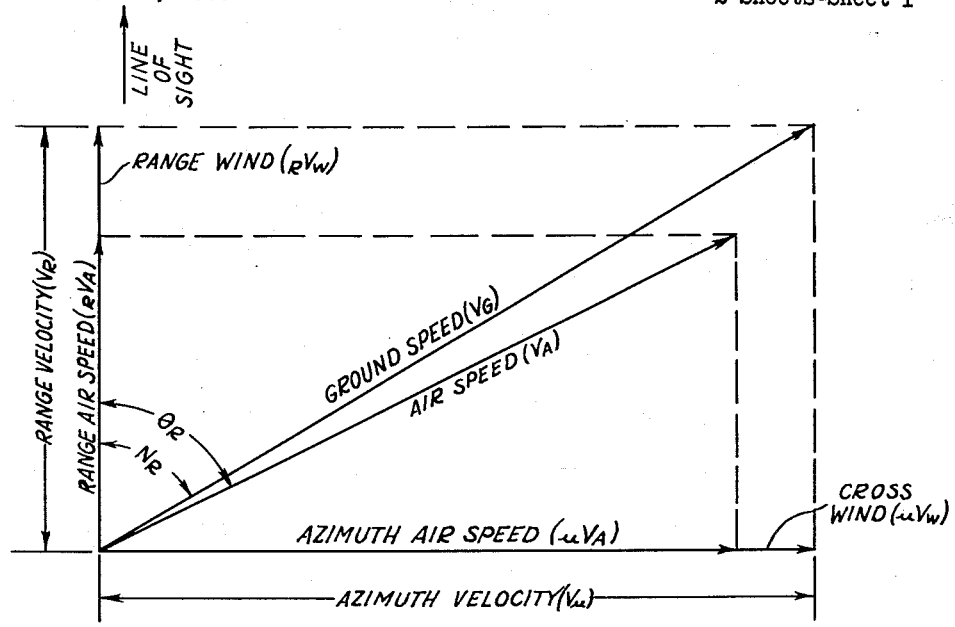
Figure 1 is a diagrammatic illustration showing the vectorial quantities involved in the present invention.

Referring now to the drawings, Figure 1 is a diagram showing the vector quantities involved in a typical ground speed problem. Air speed, which can readily be determined by commercially available air speed indicators, is resolved into two component speeds, namely, range air speed and azimuth air speed. To these two components there are vectorially added range wind and cross wind, respectively, to provide range velocity and azimuth velocity. In the diagram of Figure 1, both range wind and cross wind are shown being added to the respective air speed components. However, it should be understood that these wind factors could also be in the opposite direction, in which case either one or both might have to be subtracted from the respective air speed components. However, this condition presents no serious problem as will be shown later; these components are combined by means of differentials which can both add and subtract.

The resultant of range velocity (VR) and azimuth velocity ($Vu$) is the desired ground speed (VG) and the angle NR is the desired relative course heading, which is the angle between the direction of ground speed and the line of sight, which is used as a reference direction.

Figure 2:
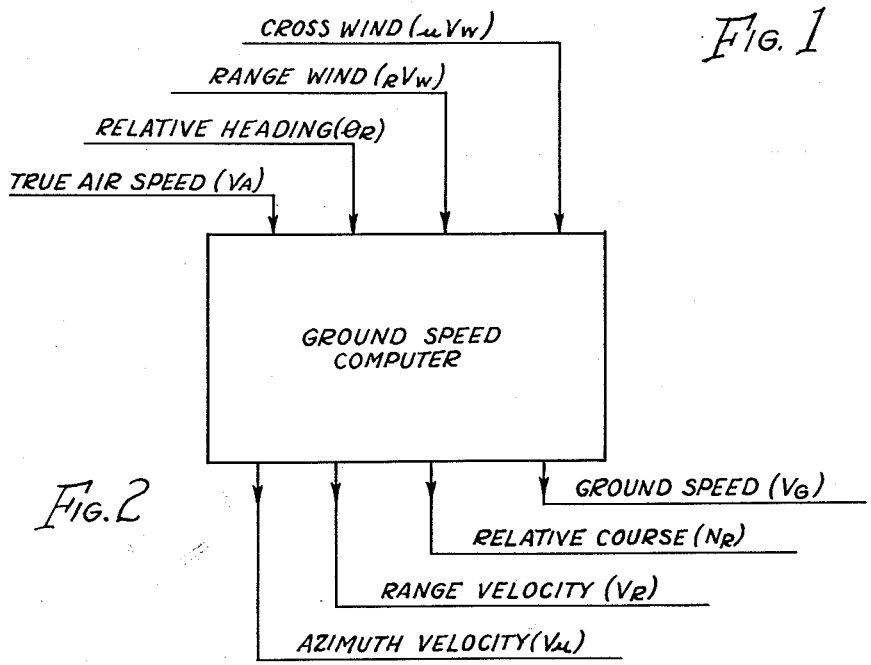
Figure 2 is a diagram showing the various input and output factors of a ground speed computer embodying the present invention.

Referring now to Figure 2 of the drawing, there can be seen the inputs and outputs of a ground speed computer embodying the principles of this invention. True air speed (VA), relative heading ($\theta$R), range wind (RVW), and cross wind ($u$VW) are inputs, and the outputs of the computer are ground speed (VG), relative course (NR), range velocity (VR), and azimuth velocity ($Vu$).

Figure 3:
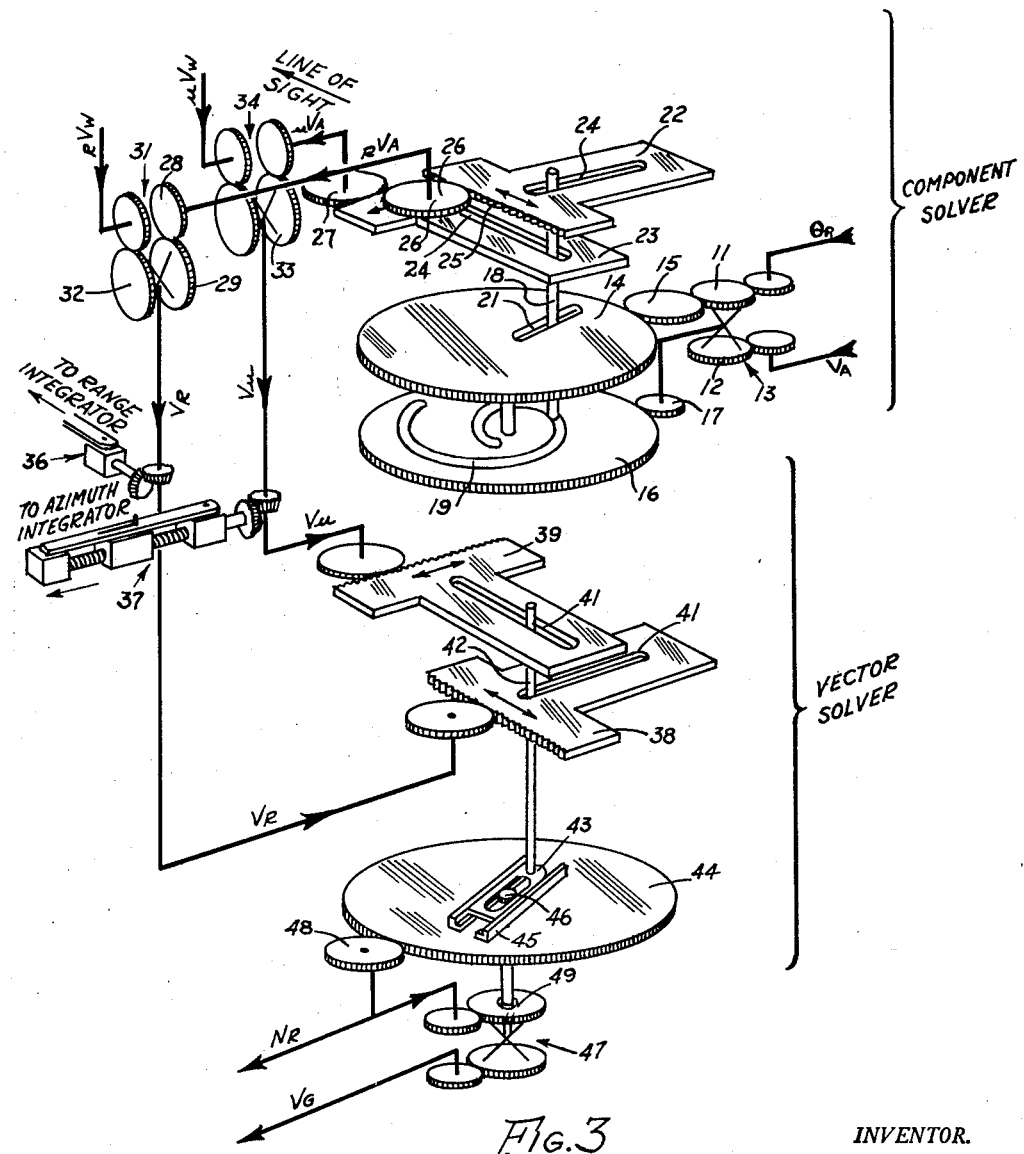
Figure 3 is a diagrammatic view showing the construction of a ground speed computer according to the invention disclosed herein.

Referring now to Figure 3 of the drawing, there is shown an embodiment of the present invention which can perform the functions shown in Figures 1 and 2. For purposes of simplicity, the mechanisms are designated as a "component solver" and a "vector solver," although both designated units will normally be placed in a single housing or casing. Referring first to the portion of the computer designated "component solver," it is shown that relative heading ($\theta$R) and air speed (VA) are inputs to gears 11 and 12, respectively, of a differential 13. Relative heading and air speed are introduced into the differential as shaft rotations, that is, one revolution of gear 12 represents a predetermined value of air speed and also one revolution of gear 11 represents a predetermined number of degrees of heading.

Differential 13 and the other differentials which are referred to hereafter are standard components well known in the fire control art and comprise, in general, two inputs and one output. One well known and widely used differential is the bevel gear differential which has a cross shaft and four bevel gears meshed together. All four of the bevel gears are free to rotate on precision bearings. The cross shaft has two shafts whose longitudinal axes are mutually perpendicular. One shaft of the cross shaft is substantially longer than the other and is generally referred to as the spider shaft. Normally three spur gears are provided on the spider shaft to connect two of the bevel gears and the spider shaft to other mechanisms. One of the three spur gears is referred to as an output gear and is pinned to the spider shaft. It is the only gear in the mechanism that is pinned directly to a shaft. The output of the bevel gear differential is one-half the sum (or difference) of the inputs. It should be understood, of course, that there is no intention to so limit the present invention to a spur gear type differential as other types will work equally well.

Vector gear 14 is rotatably driven by gear 11 through idler 15 and cam gear 16 is rotatably driven by the spider of differential 13 through gear 17. Pin 18 has one end engaging a cam groove 19 and this pin also passes through slot 21 in gear 14. Slot 21 is elongated and also is only wide enough to permit the movement of pin 18 along the longitudinal direction of slot 21. Gears 15 and 17 are selected so that vector gear 14 and cam gear 16 are driven at the same rate by input $\theta R$. Therefore a change in the relative heading $\theta R$ will change only the angular position of pin 18 with respect to a reference line passing through the common axis of rotation of vector gear 14 and cam gear 16 without changing the radial distance from pin 18 to this common axis. The cam slot 19 in cam gear 16 preferably follows a curve of the form $r=a\phi$ where $r$ is the radial distance from the axis of cam gear 16 to a selected point on cam slot 19, $a$ is a constant, and $\phi$ is the angle between a reference line passing through the axis of rotation of cam gear 16 and a line drawn from the axis to the selected point on cam slot 19. When cam slot 19 has this form, the radial distance from pin 18 to the common axis of rotation of gears 14 and 16 along the line of slot 19 will be directly proportional to the input VA. It should now be apparent that the common axis of rotation of gears 14 and 16 corresponds to the common origin of the rectangular and polar coordinate systems of Figure 1 and that the position of pin 18 corresponds to the end of vector VA. The reference line for measuring the angular positions of gears 14 and 16 corresponds to the line of sight shown in Figure 1. The perpendicular distance from pin 18 to this line corresponds to the azimuth air speed ($u$VA) of Figure 1 while the perpendicular distance from pin 18 to a line in the system of Figure 3 which is perpendicular to the line representing the line in sight corresponds to the range air speed (RVA) of Figure 1.

Pin 18 is adaptable for displacing two racks, namely, range air speed rack 22 and azimuth air speed rack 23. Each rack has an elongated slot 24 that is only as wide as pin 18, the slot in rack 23 having its longitudinal axis parallel with the line of sight, and the slot in rack 22 having its longitudinal axis transverse to the line of sight. Rack 22 is confined by suitable means (not shown) to movement in a direction perpendicular to the slot 24 formed therein and, similarly, rack 23 is confined to movement in a direction transverse to the slot 24 formed therein. It should now be apparent that movement of pin 18 in a direction parallel with the line of sight will translate rack 22 in a direction parallel with the line of sight, and likewise translation of pin 18 in a direction perpendicular with the line of sight will translate rack 23 in a direction transverse to the line of sight. Any difference in the size of pin 18 and the width of slots 21 and 24 will introduce play or backlash in the computer and so there should be a very close slip fit between the pin and slots. Racks 22 and 23 are provided with teeth 25, and gears 26 and 27 are mated with these racks, respectively. It should be noted that there is a definite relationship between slot 21 in vector gear 14 and slots 24. For example, when the relative heading angle is zero degrees, the longitudinal axis of slot 21 is parallel with the longitudinal axis of slot 24 of the rack 23 and therefore movement of pin 18 will not affect rack 23 and there will not be any azimuth component of air speed. This can be verified with Figure 1, as it should be apparent that when $\theta R$ is zero degrees there will not be any azimuth component of air speed.

Any motion of gear 26 is transmitted to gear 28 which engages input gear 29 of differential 31. Range wind (RVW) is an input component to gear 32 of differential 31 and differential 31 is employed to add or subtract the two inputs, and the output of the spider of differential 31 is range velocity (VR), as shown in Figure 1. Likewise, the motion of gear 27 is transmitted to the input gear 33 of differential 34, and cross wind ($u$VW) is an input component to gear 35 of differential 34. The output of the spider of differential 34 is azimuth velocity (V$u$). As the value of range velocity (VR) and azimuth velocity (V$u$) are required as input values of other bomb director components, these values are transmitted by gear and screw means 36 and 37, respectively, to the range integrator component and azimuth integrator component of the bomb director.

In summary of the heretofore discussion, it can be seen that in that portion of the computer designated as the "component solver," air speed (VA) and relative heading ($\theta R$) are introduced as input factors and then resolved into range air speed (RVA) and azimuth air speed ($u$VA), and these are then vectorially added to range wind (RVW) and cross wind ($u$VW), respectively, to provide range velocity (VR) and azimuth velocity (V$u$). As shown in Figure 1 of the drawings, it can be seen that the resultant of these two outputs is the desired ground speed (VG) which is computed in the "vector solver."

Referring again to Figure 3 of the drawings, and now to that portion of the ground speed computer designated as "vector solver," it can be seen that range velocity (VR) and azimuth velocity (V$u$) are provided as rotational inputs which drive racks 38 and 39, respectively, through the rack and pinion gearing shown in Figure 3. These racks are similar in structure to racks 22 and 23 in that they are each restricted to backward and forward motion and each is provided with a longitudinal slot 41, the respective slots being mutually perpendicular. Rack 38 is restricted to move parallel with the line of sight and the longitudinal axis of slot 41 in this rack is transverse to the direction of motion of the rack. Rack 39, on the other hand, is restricted to move transversely to the line of sight and similarly the longitudinal axis of slot 41 in rack 39 is transverse to the direction of motion of rack 39. Speed pin 42, whose diameter is such that the pin is slip fitted through slots 41, passes through the slots 41 of racks 38 and 39 and engages speed rack 43, which is slidably mounted on vector gear 44 by means of guides 45. Speed rack 43 has teeth thereon that drives speed gear 46. Gears 44 and 46 rotate about the same axis but are free to rotate with respect to each other. However, movement of pin 42 about the common axis of rotation of gears 44 and 46 will rotate gear 46 even though the radial distance between pin 42 and the axis of rotation of gears 44 and 46 does not change. The reason for this is that the speed rack 43 engages gear 46 at a point displaced from the axis of rotation of gear 44. To compensate for this unwanted rotation of gear 46, gear 46 is connected to the spider of differential 47. Vector gear 44 also drives gear 48 which in turn is rotatably connected to and in drivable relation with gear 49 of differential 47. The gear train connecting gears 48 and 49 is so selected that rotation of vector gear 44 only, with no change in the radial distance from pin 42 to the axis of rotation of gear 44, causes no change in the output VG of differenital 47. Therefore the output NR of Figure 3 will correspond to the course angle (NR) of Figure 1 and the rotational position of output VG of differential 47 will represent the length of ground speed vector VG of Figure 1.

In operation the ground speed computer is only one of many components that are required to make a complete bomb director. The ground speed computer is furnished certain data information, as shown by Figure 1, and resolves this information into other useful information required by the bomb director.

It should be understood, of course, that the foregoing disclosure relates to only a preferred embodiment of the invention and that numerous modifications or alterations may be made therein without departing from the spirit and the scope of the invention.

What is claimed is:

A computer for computing ground speed velocity of an aircraft comprising: a first differential for combining input data of air speed and relative heading angle relative to a line of sight, said differential having a first output representative of the combined input data and a second output representative of relative heading angle; a cam gear in drivable relation with said first output of said differential; a first vector gear in drivable relation with said second output; a pin in following relation with said cam gear and slidable relation with said first vector gear; first and second gear racks in drivable relation with said pin, said first rack being translatable in a direction parallel with said line of sight for providing a first component of air speed and said second rack being translatable in a direction transverse to said line of sight for providing a second component of air speed; a second differential for algebraically combining said first component of air speed with a component of wind velocity parallel with said line of sight; a third differential for algebraically combining said second component of air speed with a component of wind velocity transverse to said line of sight; a third rack connected to the output of said second differential; a fourth rack connected to the output of said third differential; a second vector gear; a speed rack slidably attached to said second vector gear; a speed pin connected to said speed rack and slidably connected with said third and fourth racks; an output gear in drivable relation with said speed rack; and a fourth differential having one input connected with said output gear and a second input connected with said second vector gear whereby the output of said fourth differential is representative of the ground speed of said aircraft.

References Cited in the file of this patent

UNITED STATES PATENTS

| | | |
|---|---|---|
| 2,412,443 | Crooke | Dec. 10, 1946 |
| 2,429,606 | Campbell | Oct. 28, 1947 |
| 2,523,158 | Ewing | Nov. 28, 1950 |
| 2,553,529 | Dehmel | May 15, 1957 |

OTHER REFERENCES

Product Engineering ("Mechanical Computing Mechanisms," by Reid and Stromback), September and November 1949, pps. 121-123 and 121-124, respectively, are relied on.